United States Patent
Elias et al.

(10) Patent No.: US 10,223,757 B2
(45) Date of Patent: *Mar. 5, 2019

(54) USER-SPECIFIC EVENT POPULARITY MAP

(71) Applicant: STUBHUB, INC., San Francisco, CA (US)

(72) Inventors: Ramon Elias, Walnut Creek, CA (US); Matthew B. Gustke, Greenbrae, CA (US); Srini Venkatesan, San Jose, CA (US)

(73) Assignee: EBAY INC., San Jose, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 14/987,691

(22) Filed: Jan. 4, 2016

(65) Prior Publication Data

US 2016/0132974 A1    May 12, 2016

Related U.S. Application Data

(63) Continuation of application No. 13/631,307, filed on Sep. 28, 2012, now Pat. No. 9,230,288.

(60) Provisional application No. 61/540,136, filed on Sep. 28, 2011.

(51) Int. Cl.
| | |
|---|---|
| G06Q 50/00 | (2012.01) |
| G06Q 10/10 | (2012.01) |
| G06Q 30/02 | (2012.01) |

(52) U.S. Cl.
CPC ......... G06Q 50/01 (2013.01); G06Q 10/1095 (2013.01); G06Q 30/0201 (2013.01); G06Q 10/109 (2013.01)

(58) Field of Classification Search
CPC .... G06Q 10/02; G06Q 30/02; G06Q 30/0207; G06Q 30/06; G06Q 30/0601
See application file for complete search history.

(56) References Cited

U.S. PATENT DOCUMENTS

| | | |
|---|---|---|
| 8,467,955 B2 | 6/2013 | Jiang et al. |
| 2002/0026289 A1 | 2/2002 | Kuzunuki et al. |
| 2003/0220981 A1 | 11/2003 | Nakamura et al. |
| 2006/0195361 A1 | 8/2006 | Rosenberg |
| 2007/0233736 A1 | 3/2007 | Xiong et al. |

(Continued)

OTHER PUBLICATIONS

Dahlquist, David. "The Hotlist brings its geo-trending service to the iPhone". Macworld, Aug. 2, 2010, 6 pgs.
Wauters, Robin. "The Hotlist Raises $800,000 for Geo-Aware "What's Going on" Service". TechCruncg, Mar. 13, 2010, 9 pgs.
Warren, Christina. "Plan Your Social Calendar with the Hotlist". Mar. 14, 2010, 5 pgs.
Non-Final Office Action received for U.S. Appl. No. 13/631,307, dated Apr. 18, 2014, 12 pgs.

(Continued)

Primary Examiner — Andrea Long
(74) Attorney, Agent, or Firm — Maschoff Brennan

(57) ABSTRACT

Information can be provided in a convenient manner to help a user decide what events to attend. The information can include information regarding a popularity of the events. The popularity of the events can be based upon the number of people expected to attend, the number of the user's friends expected to attend, and/or the number of people fitting user-defined criteria who are expected to attend. The events for a user-specified time period can be shown on a map along with information representing the popularity of the events. Thus, the user can choose to attend those events in the user's area which are more popular. The map can be displayed on a user device, such as a cellular telephone. In this manner, the user can more readily attend those particular events which the user is more likely to enjoy.

20 Claims, 6 Drawing Sheets

(56) References Cited

U.S. PATENT DOCUMENTS

| | | |
|---|---|---|
| 2007/0179792 A1 | 8/2007 | Kramer |
| 2008/0255889 A1 | 10/2008 | Geisler et al. |
| 2009/0100037 A1 | 4/2009 | Scheibe |
| 2009/0287687 A1 | 11/2009 | Martire et al. |
| 2010/0063854 A1 | 3/2010 | Purvis et al. |
| 2010/0114954 A1* | 5/2010 | Sareen .............. G06F 17/30864 |
| | | 707/776 |
| 2010/0216490 A1 | 8/2010 | Linden |
| 2011/0035329 A1 | 2/2011 | Delli Santi et al. |
| 2011/0083101 A1 | 4/2011 | Sharon et al. |
| 2011/0225015 A1* | 9/2011 | Spivack ........... G06Q 10/06314 |
| | | 705/7.24 |
| 2011/0320495 A1 | 12/2011 | Levy-Yurista et al. |
| 2012/0047129 A1 | 2/2012 | Redstone et al. |
| 2012/0220314 A1 | 8/2012 | Altman et al. |
| 2012/0221362 A1 | 8/2012 | Nezer et al. |
| 2012/0284333 A1 | 11/2012 | Neff |

OTHER PUBLICATIONS

Response to Non-Final Office Action filed Jul. 18, 2014 for U.S. Appl. No. 13/631,307, dated Apr. 18, 2014, 14 pgs.
Final Office Action received for U.S. Appl. No. 13/631,307, dated Nov. 12, 2014, 11 pgs.
Response to Final Office Action filed Feb. 12, 2015 for U.S. Appl. No. 13/631,307, dated Nov. 12, 2014, 14 pgs.
Non-Final Office Action received for U.S. Appl. No. 13/631,307, dated Feb. 26, 2015, 12 pgs.
Response to Non-Final Office Action filed May 26, 2015 for U.S. Appl. No. 13/631,307, dated Feb. 26, 2015, 17 pgs.
Notice of Allowance received for U.S. Appl. No. 13/631,307, dated Sep. 4, 2015, 10 pgs.

\* cited by examiner

USER-SPECIFIC EVENT POPULARITY MAP

CROSS REFERENCE TO RELATED APPLICATIONS

This application is a continuation of U.S. patent application Ser. No. 13/631,307, filed Sep. 28, 2012, which claims priority to U.S. Provisional Patent Application No. 61/540,136, filed Sep. 28, 2011, all of which are incorporated by reference in their entirety.

BACKGROUND

Technical Field

The present disclosure generally relates to electronic commerce and, more particularly, relates to a method and system for providing a user with a map of events wherein the events can be coded, for example, according popularity as determine by user-specified criteria.

Related Art

Event calendars are well known. Event calendars show when events such as concerts and sporting event will occur. For example, event calendars can commonly be found in newspapers, magazines, and online. Such event calendars typically specify what the event is (such as the name of a band for a concert event or the names of the opposing teams for a sporting event), the time and date of the event, and the venue for the event. Such information can be helpful to a person who is searching for an event to attend. However, such information does not let the person know how popular the event is or how many of the person's friends may be attending the event.

Social networks may provide information regarding what events the person's friends are planning to attend. However, this information is not presented in a convenient and sufficiently useful manner. The person may have to search through many of their friend's social network pages and/or messages to determine which of the user's friends are going to which events. Often, such information regarding what events the person's friends are planning to attend is not available via social networks.

DETAILED DESCRIPTION

Figure 1:
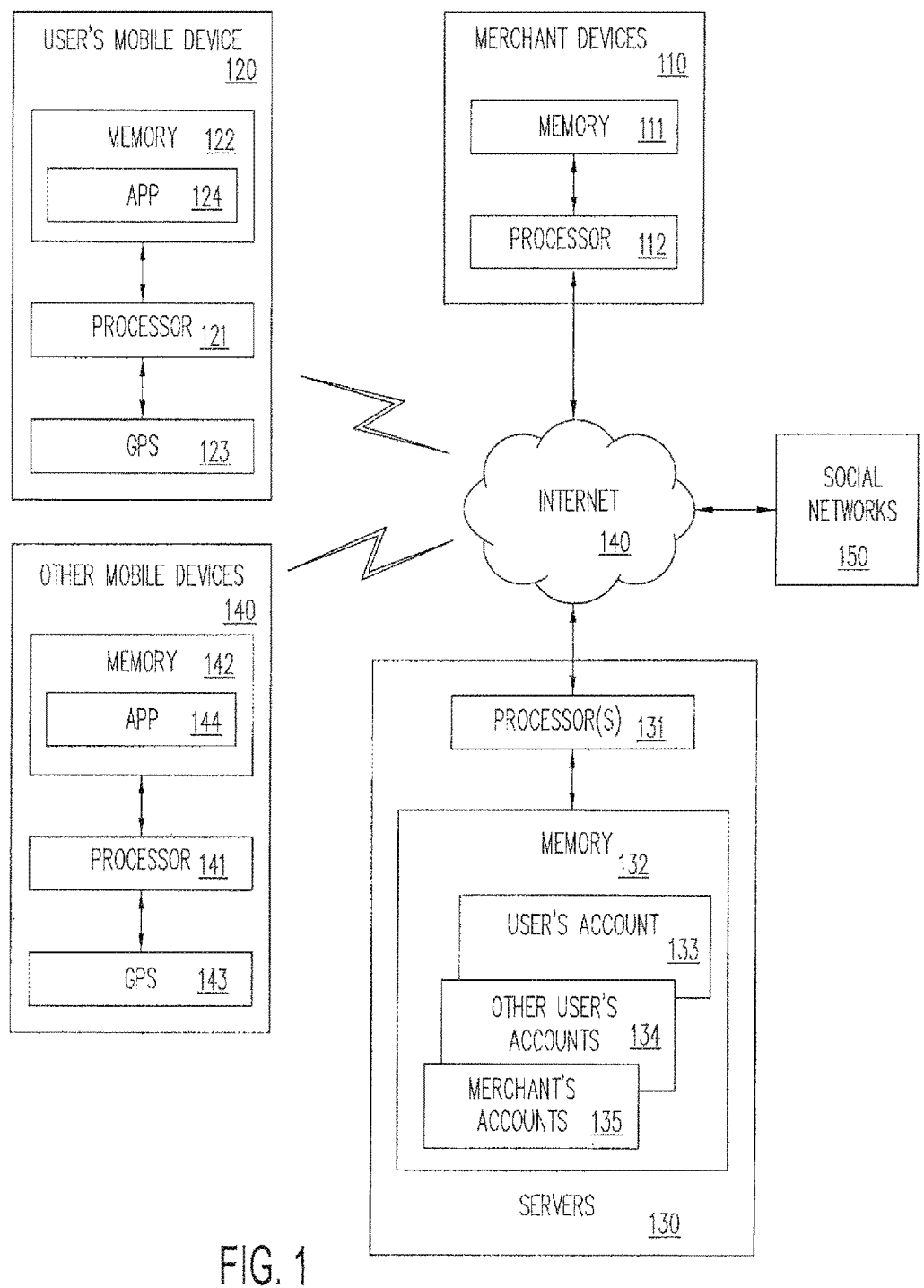
FIG. 1 is a block diagram of a system for providing user-specific event popularity maps, according to an embodiment.

According to an embodiment, information can be provided in a convenient manner to help a user decide what events to attend. The information can include information regarding a user-defined popularity or expected attendance of the events. The popularity of the events can be based upon the number of people who are expected to attend, the number of the user's friends who are expected to attend, and/or the number of people fitting user-defined criteria who are expected to attend, for example. The events for a user-specified time period can be shown on a map along with information representing the popularity of the events. Thus, a user-specific event popularity map can be provided.

The map can be displayed on a user device, such as a cellular telephone. Thus, the user can choose to attend those events which are more popular or which meet other user-defined criteria. In this manner, the user can more readily attend those particular events which the user is more likely to enjoy.

The events can be social or recreational events, such as concerts and sporting events. The events can be business related events, such as business meetings, conferences, retreats, and the like. The user-defined criteria for such recreational events can include the names of specific friends who the user wants to know are attending. Other user-defined criteria for such recreational events can include attributes of people such as their sex, age, or any other attributes for which information can be obtained. The user-defined criteria for business related events can include the names of co-workers, superiors (supervisors, managers, officers of a company, members of a board of directors, stockholders, and the like), employees, guests (such as guest speakers) and the like who the user wants to know are attending.

The user-defined criteria for any events can include shared social attributes. Such social attributes can include likes, dislikes, ages, sexes, and the like. Different social attributes can be used with different types of events. For example, the user may want to attend baseball games only with other beer drinkers (or conversely, the user may want to attend baseball games only with other non-drinkers). In this manner, the user can apply social filtering to the event.

The popularity can be determined by other criteria. The popularity can be determined by criteria regarding what, other than people, is to be present. For example, a user who is interested in blues music can set up the system to give a higher popularity rating to an event that features blues music than an event that features another type of entertainment. The user can set up the system to weigh events based on such factors. For example, the user can set up the system to increase the popularity by 50 percent when blues music is featured and to decrease the popularity by 50 percent when heavy metal music is featured.

The popularity can be determined, at least in part, by negative criteria. For example, the absence of people generally, the absence of specified people specifically, the absence of people having specified attributes (such as sex or age) and/or the absence of specified things (cigarette smoking, alcohol consumption, a specific genre of music, and/or loud music, for example) can result in a higher popularity.

User-specified types of events can be filtered out or omitted. For example, if the user does not want to attend basketball games, then basketball games can be omitted from the map. User-specified types of events can be highlighted. For example, if the user is particularly interested in attending hockey games, then hockey games can be highlighted on the map with color, brightness, size, or any other attribute.

The events can be filtered on any desired criteria. For example, the events can be filtered on other criteria such as venue size, type of food served, type of beverages offered (such as alcoholic vs. only non-alcoholic), smoking vs. non-smoking, type of seating (plush vs. hard), and the like.

The expected attendance can be determined, at least in part, via ticket sales, social media, social networks, history, online sales of associated or proxy products (such as Metallica t-shirts near a venue where Metallica is about to play). The expected attendance can be determined, at least in part, by indications of interest or indications of expected attendance provided by prospective attendees. For example, the number of people visiting a website regarding the event can provide an indication of expected attendance. As a further example, people can be queried regarding their likelihood of attending and their responses, at least in part, can be used to determine the expected attendance.

The time remaining until the event can be taken into account when using ticket sales to determine the expected attendance. Thus, the number of unsold tickets which will be sold before the event take place can be estimated based upon the ticket sales to date and based upon the time remaining before the event. This estimate can help to better determine the expected attendance of the event. The popularity of an event can be based, at least in part, upon the percentage of the venue's capacity for which tickets have been sold or which is expected to be sold prior to the event.

The expected attendance can be inferred, at least in part, from the popularity of the event as listed on review web sites such as Yelp. Such information can be combined with other information to determine the popularity of the event. For example, the popularity of the event can be determined from the historic popularity of the venue as determined from one or more review web sites combined with the popularity of the attraction (the entertainer, the band, the teams, etc.) as determined by historic attendance of events featuring the attraction.

The population of the geographic area within which the venue is located, as well as demographic information regarding the population can be used, at least in part, to determine the popularity of the event. For example, if the attraction generally appeals to people in the age range of 18-25 and the demographics for the area within which the venue is located indicates that a large percentage of the population is in the age range of 18-25, then this information can tend to increase the popularity of the event.

Users can be queried regarding their likelihood of attending an event when they are using the user-specific event popularity maps disclosed herein. For example, when a user shows interested in a particular event, such as by requesting further information regarding the event, then the user can be queried regarding the user's likelihood of attending the event.

The map can be displayed only for events on a specified date. The map can be displayed for events during a period of time, such as during a specified week, month, or user defined period of time. The map can be displayed for events that occur during a user-specified period of time.

According to an embodiment, a system can comprise a first memory for storing map information for a geographic area and a second memory for storing upcoming event information for a plurality of upcoming events. The event information can include information regarding what the event is, when the event is happening, where the event is happening, and some indication of the expected attendance for the event (such as ticket sales to date and/or estimated future ticket sales).

One or more processors can be operable to receive a first communication including an indication of a desire of a user to view an event popularity map for at least some of the upcoming events. The processor(s) can be operable to access the map information, access the upcoming event information, and combine the upcoming event information with the map information to at least partially define the popularity map. The event popularity map can indicate locations of the upcoming events and can indicate an expected attendance of the upcoming events. The processor(s) can be operable to send a second communication including the event popularity map to the user.

The event popularity map can indicate an amount of the expected attendance by at least one of a color of an event icon and a size of the event icon. For example, an event icon can be placed on the map at the location of the event and the size of the event icon can be proportional to the expected attendance, i.e., bigger event icons can indicate higher expected attendance (either as a percentage of the capacity of the venue or simply as the number of people expected to attend the event). The color, size, or any other attribute of the icon can provide any other desired information regarding the event.

A spectrum of colors can be used to indicate attendance. For example, red can indicate a full house, orange can indicate a nearly full house, yellow can indicate a half full house, and so on. The number of expected attendees or friends who plan to attend can be provided, such as upon or near the icon, for example. The number of expected attendees or friends who plan to attend can be provided in a pop-up window, as discussed herein.

The expected attendance for the upcoming events can be based upon a number of people who have purchased tickets for the upcoming events. The expected attendance can be based upon historic information, such as the number of people who have attended similar events in the past. The expected attendance for the upcoming events can be based upon any useful criteria or combination of criteria.

According to an embodiment, the processor(s) can be operable to access social network information to determine which of the user's friends will be attending which of the upcoming events. For example, the processor(s) can access social network information from social networks such as Facebook, YouTube, Twitter, LinkedIn, Yelp, MeetMe, MyYearbook, Google+, MySpace, and Pinterest. The expected attendance of the upcoming events can be an expected attendance by the user's friends of the upcoming events. Thus, the map can show event icons that indicate (such as by size, color, or number) the number of the user's friends who are planning to attend the event.

According to an embodiment, the first communication can include an indication of a time period for which the upcoming events are to be shown on the popularity map. The first communication can include an indication of an area within which the upcoming events are to be shown on the popularity map. The upcoming event information can be combined with the map information for events that occur during the time period and that are within the area. Defaults or user presets can be used to determine the time period and/or geographic area of the map.

According to an embodiment, the processor(s) can be operable to receive a third communication including an indication of an event of interest to the user. The processors(s) can send to the user a fourth communication including additional information regarding the event of interest to the user.

According to an embodiment, the processor(s) can be operable to receive a third communication including an indication of a filter for the upcoming events. The processor(s) can send to the user a fourth communication including filtered information regarding the upcoming events.

According to an embodiment, a method can comprise storing, in a first memory, map information for a geographic area and storing, in a second memory, event information for a plurality of upcoming events. The event information can include information regarding what the event is, when the vent is happening, where the event is happening, and some indication of the expected attendance for the event (such as ticket sales to date and/or estimated future ticket sales).

The method can comprise receiving, electronically by one or more processors, a first communication including an indication of a desire of a user to view an event popularity map for at least some of the upcoming events, wherein the event popularity map indicates locations of the upcoming events and indicates an expected attendance of the upcoming events. The method can comprise accessing, by the processor(s), the map information. The method can comprise accessing, by the processor(s), the upcoming event information. The method can comprise combining, by the processor(s), the upcoming event information with the map information to at least partially define the popularity map. The method can comprise sending, by the processor(s), a second communication including the event popularity map to the user.

According to an embodiment, a computer program product can comprise a non-transitory computer readable medium having computer readable and executable code. The code can instruct one or more processors to perform any of the methods disclosed herein.

According to an embodiment, multiple levels of filtering can be provided to help the user determine which events to attend. For example, during a set up process the user can define a first level of filtering by specifying what types of events to display and within what geographic boundaries the events must occur to be displayed. After the events are displayed, the user can, substantially in real time, apply additional filtering by specifying more particularly what events to show based upon additional criteria, such as sex and age demographics of the expected attendees.

The displayed events can be represented as icons that are representative of these or other criteria, thus allowing the user to visually self-apply additional filtering. For example, the icons can be bigger and/or brighter for events that are more popular to the user, as determined by user-defined parameters, e.g., highest popularity for events where the most of the user's friends are expected to attend, and the use can visually self-apply filtering by considering only the largest icons among those which are displayed. In this manner, the user can more easily visually determine which events best fulfill the user's criteria.

The filtering process can be iterative. That is, the user can re-apply one or more of the various levels of filtering, such as by changing the criteria regarding the people expected to attend. The process of changing the criteria and displaying the results can continue until the user is satisfied with the displayed results, e.g., until the user decides which, if any, of the events to attend.

According to an embodiment, a system can comprise one or more memories for storing map information for a geographic area and for storing upcoming event information for a plurality of upcoming events. The system can further comprise one or more processors that are operable to receive one or more user specified parameters to determine a popularity of the events for the user, determine upcoming events for a user, determine from the upcoming events and the one or more user specified parameters a user-specific event popularity map, and communicate the user-specific event popularity map to the user for display on a user device. The event popularity map can indicate the popularity of the events by at least one of a color of an event icon and a size of the event icon. One of the user specified parameters can be an expected attendance (such as by the general public, the user's friends, and/or people fitting any specified criteria) for the upcoming events. The specified parameters can include any criteria specified by the user, such as type of music, ages of attendees, sexes of attendees, type of event, and the like. The expected attendance can be based upon a number of people who have purchased tickets for the upcoming events.

FIG. 1 is a block diagram of a system for providing user-specific event popularity maps, according to an embodiment. The system can include a plurality of merchant devices 110. The merchant devices 110 can be merchant checkout terminals, computers, and/or servers, for example. Each of merchant devices 110 can include a memory 111 and a processor 112. The merchant devices 110 can be used to collect information that can be used, at least in part, to make the user-specific event popularity maps. For example, the merchant devices 110 can be used to sell tickets to events (such as concerts and sporting events) and/or to record reservations for events (such as dinners, dinner theaters, and the like).

The system can include a user's mobile device 120. The user's mobile device 120 can be carried by the user. The user's mobile device 120 can be a cellular telephone, a smart telephone, a hand held computer, a laptop computer, a notebook computer, or a tablet computer, for example. The user's mobile device 120 can include a processor 121, a memory 122, and a global positioning system (GPS) 123, for example.

An app 124 can be stored in the memory 122 and can be executed by the processor 121. The app 124 can be used by the user to request, filter, and view the user-specific event popularity map.

The system can include a plurality of other mobile devices 140. The other mobile devices 140 can be carried by other users. The other mobile devices 140 can be cellular telephones, smart telephones, hand held computers, laptop computers, notebook computers, or tablet computers, for example. Each of the other mobile devices 140 can include a processor 141, a memory 142, and a global positioning system (GPS) 143, for example.

An app 144 can be stored in the memory 142 of each of the other mobile devices 140 and can be executed by the processor 141. The app 144 can be used by others (people other than the user) to perform activities such as purchasing tickets, making reservations, posting information to a social network, indicating an interest in attending an event, and the like. Information regarding such activities can be used by the system, at least in part, to make the user-specific event popularity map.

The system can include servers 130. The servers 130 can be a single server or can be a plurality of servers, operated by the same or different entities. The servers 130 can be any number of servers, which can be located with one another (collocated) or can be located remotely with respect to one another. For example, the servers 130 can comprise a server of an online ticket seller such as StubHub, a server of a payment provider such as PayPal, and/or one or more other servers.

The servers 130 can include one or more processors 131 and a memory 132. The memory 132 can be associated with an online ticket seller or a payment provider. The memory 132 can be a distributed memory. The memory 132 can store a user's account 133, other user's accounts 134, and merchant's accounts 135. The servers 130 can be configured and used to make the event popularity map.

One or more social network 150 can provide information regarding expected attendance at events by the user's friends. The social networks 150 can include Facebook, YouTube, Twitter, LinkedIn, Yelp, MeetMe, MyYearbook, Google+, MySpace, Pinterest, and the like. The social networks 150 can include any servers, websites, or the like that receive, store, provide, post, communicate, disseminate, and/or broadcast information regarding the attendance, potential attendance, or intended attendance of events by people, such as members of the social networks 150.

The merchant devices 110, the user's mobile device 120, the other mobile devices 140, the servers 130, and/or the social networks 150 can communicate with one another via a network, such as the Internet 140. The merchant devices 110, the mobile device 120, the other mobile devices 140, the servers 130, and/or the social networks 150 can communicate with one another via one or more networks, such as local area networks (LANs), wide area networks (WANs), cellular telephone networks, and the like.

Figure 2:
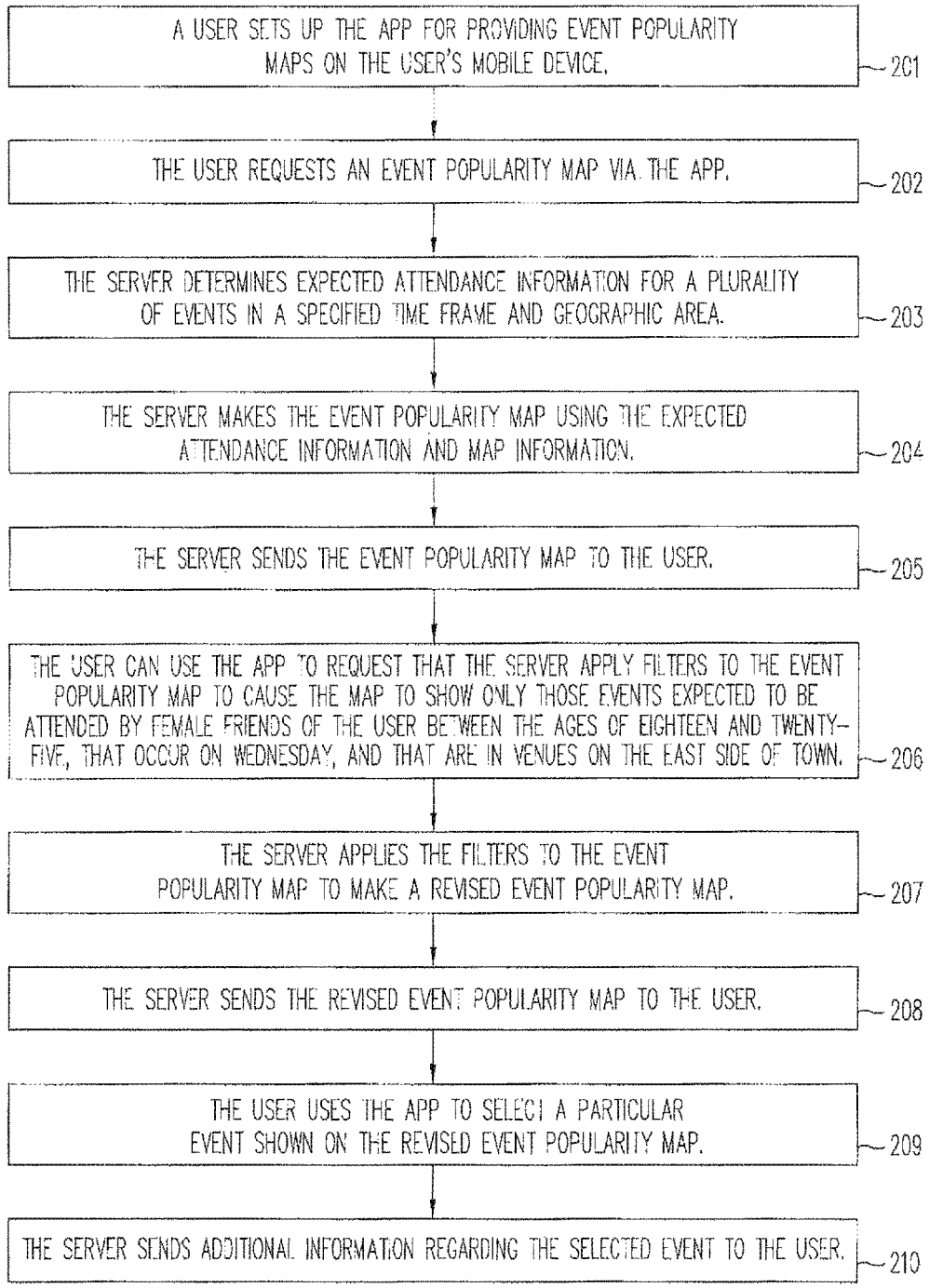
FIG. 2 is a flow chart showing a method for providing user-specific event popularity maps, according to an embodiment.
Figure 3:
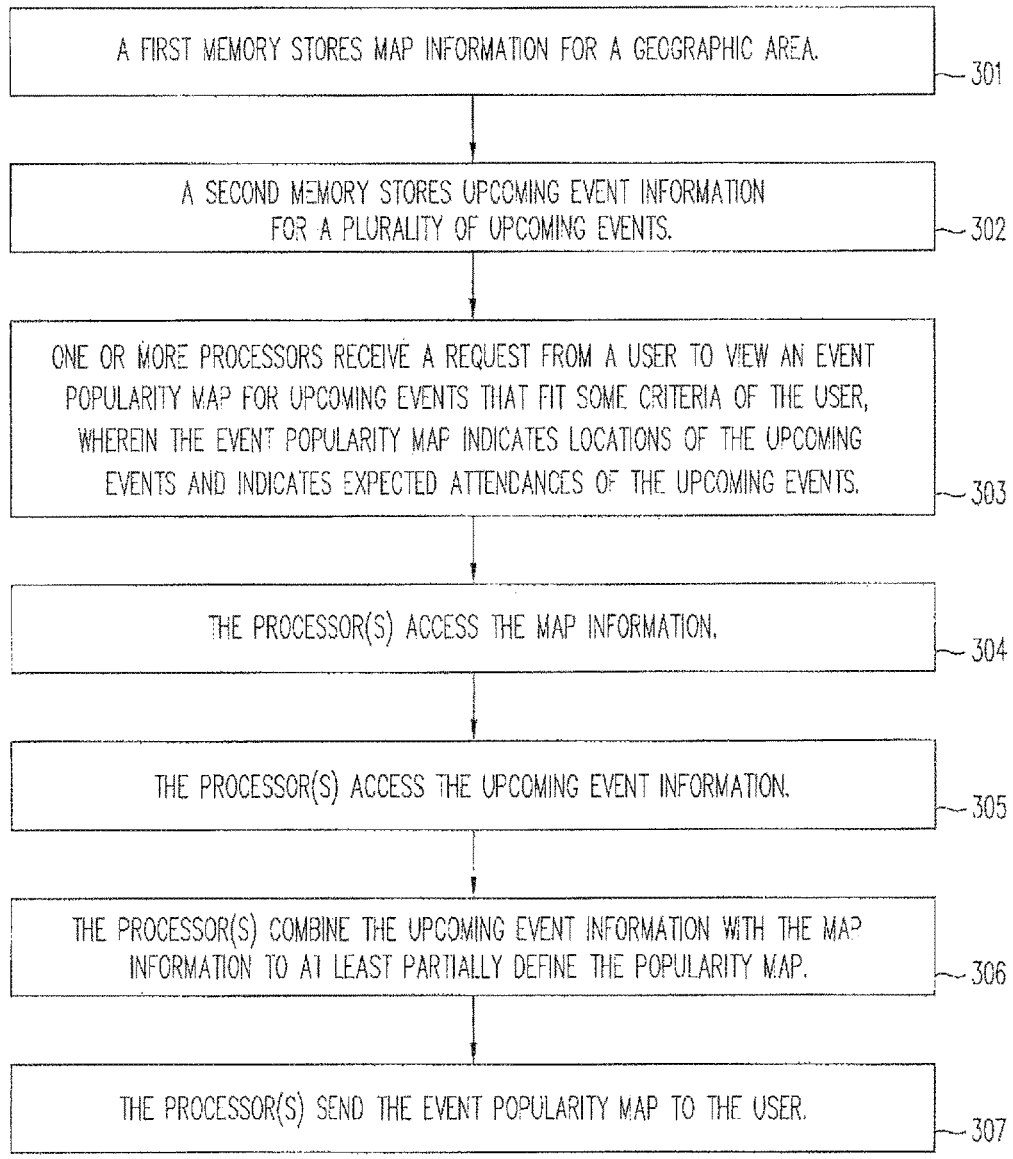
FIG. 3 is a flow chart showing further detail of the method for providing user-specific event popularity maps, according to an embodiment.

FIGS. 2 and 3 are flow charts that describe examples of operation of the system for providing user-specific event popularity maps according to embodiments thereof. Note that one or more of the steps described herein may be combined, omitted, or performed in a different order, as desired or appropriate.

FIG. 2 is a flow chart showing a method for providing user-specific event popularity maps, according to an embodiment. A user can set up the app 124 for providing event popularity maps on the user's mobile device 120, as shown in step 201. During a set up process, the user can use the app 124 and/or a web page to define the user's preferences. For example, the user can specify filtering, what information the event icons are to show, how the event icons are to be displayed, names of user's friends, social networks of the friends, photographs of the friends, as well as defaults for locations and time periods for the event popularity maps.

The user can specify any default filtering that is to be applied to event popularity maps as the event popularity maps are initially provided to the user, Additional or different filtering can then be requested and applied on a case-by-case basis. The user can request filters during the set up process to define the desired geographic area to be shown in the event popularity maps and the types of events to be shown on the event popularity maps. For example, the user can set up the system to initially provide a map for the entire city in which the user is located when the user requests an event popularity map, as based upon the GPS location of the user's mobile device 120. As a further example, the user can also set up the system to initially provide a map showing only certain types of events, such as sporting events, on the event popularity maps.

The user can specify what the event icons contain or show. The user can specify what types of events are to be shown on the event popularity maps as icons and what information regarding the events is to be shown in or along with the icons. For example, the user can specify that only football games are to be shown and that the information shown should include the names of the teams playing, the venue, the time and date of the game, and how many tickets have been sold for the event.

The user can specify how the event icons are shown. The user can specify that the events are to be shown as geometric shapes, drawings, photographs, text or any other indicia. For example, baseball games can be shown as a drawing of a baseball bat, unless the user's favorite team is playing and then a photograph of the pitcher for that team can be shown, a drawing of a guitar can be shown for concerts, and a cocktail glass can be shown for events at nightclubs.

The icons can be shown larger or in a different color as more people are expected to attend an event. The icons can be shown larger or in a different color as more of the user friends are expected to an event. The icons can be shown larger or in a different color as more of the people attending the event are expected to fit user-defined criteria or filtering.

The user can specify the names of friends, social networks of the friends, passwords for the social networks, and/or provide photographs of the friends. The servers 130 can use the names and social network information of the friends to determine which of the user's friends are expected to attend the event. For example, the servers 130 can query or investigate the social networks of the friends to determine if the friends have indicated an interest in attending the events. The photographs of the friend can be displayed as the icons, as pop-ups (such as in pop-up windows) when a cursor is place over an event, or in any other manner.

The user can select an event on a map, such as by tapping, clicking on, passing over, or hovering over the icon. Various different kinds of information can be displayed or provided as audio when the user selects an icon. The information can include the event name, venue, date, time, number of people who have RSVP's, purchased tickets, or otherwise indicate that they intend to attend the event. Information such as the number of the user's friends attending the event, the number of females attending the event, the number of males attending the event, as well as information relating to the age distribution of people attending the event, and the like can be displayed. The information to be displayed can be a default of the system and/or can be selected by the user in real time and/or as part of a set up process.

In this manner, the user can determine whether or not the demographics of the event are consistent with the user's desired demographics for the event. Thus, the user can more readily select and attend those events which are consistent with the user's desired demographics.

A picture of the attraction (the entertainer, band, or sports team, for example) can be displayed when the user selects the icon. Audio of the entertainer, band, or sports announcer can be provided. Audio and video for a commercial for the event can be provided. Advertisements can be provided in an attempt to entice the user to attend the event. Discounts or premiums can be offered.

Audio, video, or text requesting more information from the user can be provided when the user selects the icon. For example, if there are multiple occurrences of the same event within the specified time period, the user can be asked which occurrence the user is most interested in and the system can respond by providing specific information for the selected occurrence.

Selecting the icon can invite the user to play a game and/or can initiate the game. Advertisements, such as for the event, can be included with or can be integral to the game. For example, when the cursor passes over a baseball game, the user can be asked to pick from a list the name of a baseball player whose photograph is displayed. A predetermined number of correct answers can allow the user to win a prized such as a discount or premium associated with the event or an extra ticket for the event. In this manner, the user can be exposed to additional advertising in a manner that not only lacks the objection of the user, but to which the user has chosen to be exposed.

The pop-up windows can be displayed when users have an interest in a particular event (the event for which the pop-up window is displayed). The frequency with which such pop-up windows are invoked can be used, at least in part, to determine the expected attendance for the event. For example, the number of times that a particular pop-up window is invoked and/or the amount of time that the pop-up window remains displayed can be an indication of interest of users of the system for the particular event. A user can be queried by the pop-up window regarding the user's interest and/or likelihood of attending the event and the user's response can be used, at least in part, to determine expected attendance for the event.

The user can specify defaults for locations and time periods for the event popularity maps. The user can specify that the event popularity maps show a geographic area within a given distance around the user's present location (as determined by the user's GPS location), show a geographic area within a given distance around the user's home, and or show a geographic area within a given distance around a location that was specified by the user. For example, the user can specify that all events within ten miles of the user's present location and/or all events in the user's home city be displayed.

The user can specify a default for the time period during which the events shown on the event popularity map are to occur. For example, the user can specify that all specified events that day, within the next week, or within the next month be displayed.

The user can request an event popularity map via the app 124, as shown in step 202. The servers 130 can determine expected attendance information for a plurality of events in a specified time frame and geographic area, as shown in step 203. The servers 130 can make the event popularity map using the expected attendance information and map information, as shown in step 204. The event popularity map can be made using system defaults (such as system defaults that can be provided by a system administrator and that can be common among all or a substantial portion of the users) or using user presets (that are provided by the user, such as during an initial or subsequent setup process). The servers 130 can send the event popularity map to the user, as shown in step 205.

The user can use the app 124 to request that the servers 130 apply filters to the event popularity map. For example, the user can request that the servers 130 apply filters to cause the event popularity map to show only those events expected to be attended by female friends of the user between the ages of eighteen and twenty-five, that occur on Wednesday, and that are in venues on the east side of town, as shown in step 206. The servers 130 can apply the filters to the event popularity map to make a revised event popularity map, as shown in step 207. The servers 130 can then send the revised event popularity map to the user, as shown in step 208.

The user can use the app 124 to select a particular event shown on the revised event popularity map, as shown in step 209. Selecting the event can be done by clicking on the event, hovering over the event, or otherwise providing an indication of an interest in the event. Selecting the event can include purchasing tickets for the event. The tickets can be purchased automatically when the user selects the event or the user can be requested by the servers 130 to verify that the user would like to purchase such ticket, queried regarding the number of tickets to be purchased, and queried regarding any other information required by the serve 130 so that the servers 130 can sell the tickets to the user. The servers 130 can send additional information regarding the selected event to the user, as shown in step 210.

Filtering can be applied sequentially as many times as desired. For example, the default filter may show several events the same evening wherein each event is considered to be popular based upon ticket sales or initial user defined popularity categories/parameters. The user can select and filter several of the events to see which ones have friends of the user attending. If showing the user's friends who are attending the events does not help (such as when few or no friends are attending), then the user can apply criteria to filter on age and sex. For example, a twenty-four year old man may want to see which event has the most 18-24 year old women in attendance.

FIG. 3 is a flow chart showing further detail of the method for providing user-specific event popularity maps, according to an embodiment. A first memory can store map information for a geographic area, as shown in step 301. The first memory can store map information for a plurality of different geographic areas. A second memory can store upcoming event information for a plurality of upcoming events, as shown in step 302. The second memory can store upcoming event information for the different geographic areas. The first memory and the second memory can be the same memory. For example, the first memory and the second memory can be the memory 132 of one or more servers, such as the servers 130. As a further example, the first memory and the second memory can be one or more memories of a payment server and/or an online ticket seller server.

The first memory and the second memory can be two or more different memories. For example, the first memory can be a memory of a dedicated server for making the event popularity maps and the second memory can be a plurality of memories of a plurality of different online sellers, online ticket sellers, venue owners, social networks, and the like.

One or more processors can receive a request from a user to view an event popularity map for upcoming events that fit some criteria of the user, wherein the event popularity map indicates locations of the upcoming events and indicates expected attendances of each of the upcoming events, as shown in step 303. The criteria of the user can include a geographic area to be shown on the map. The criteria of the user can include any other desired criteria of the user, such as the demographics of the expected attendees.

The processor(s) 131 can access the map information, as shown in step 304. For example, the processor(s) 131 can access the map information from a dedicated map server, such as that provided by TomTom, MapQuest, or Google Maps. The processors(s) 131 can store and maintain map information independently, thus at least partially eliminating the need to access the map information from a dedicated map server.

The processor(s) 131 can access the upcoming event information for a plurality of events, as shown in step 305. For example, the processor(s) 131 can access the upcoming event information from an online ticket seller, such as StubHub, from an online payment provider, such as PayPal, and/or from the plurality of merchant devices 110 (such as merchant devices of venues). The processors(s) can access the upcoming event information from websites that promote or list schedules of events. The processors(s) can access the upcoming event information from any source available.

The upcoming event information can include information regarding the popularity of the events. The processor(s) 131 can combine the upcoming event information with the map information to at least partially define the popularity map, as shown in step 306. The processor(s) 131 add information regarding the popularity of the events that is obtained from any sources, such as social networks and users responses to queries regarding an intention to attend events. The information regarding the popularity of the events can be based upon data, assumptions, estimations, user responses, history, predictions, ticket sales, merchandise sales, or any other factor or combination of factors.

The processor(s) 131 can send the event popularity map to the user, as shown in step 307. The user can have the servers 130, the user device 120, or any other device filter the event popularity map, as discussed herein. Some filter can be performed by one device and other filtering can be performed by a different device. Filtering may be skipped if the user has initially defined parameters for the system to determine popular events for the user, such that the initial user-defined event popularity map shown to the user provides the necessary details for the user.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
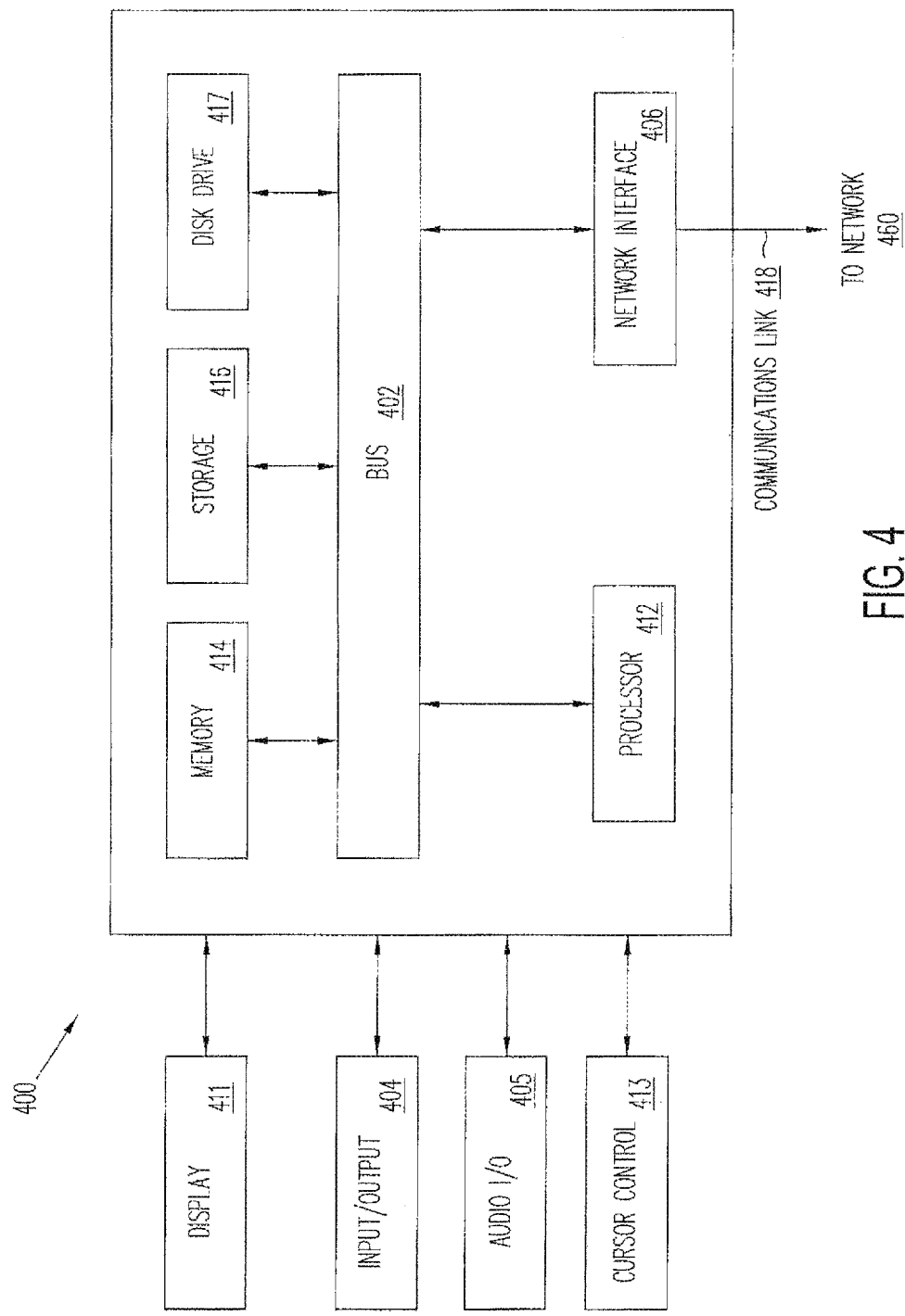
FIG. 4 is a block diagram of an example of a computer that is suitable for use in the system for providing user-specific event popularity maps, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

According to an embodiment, a service provider, such as StubHub can provide a map of event locations to a user on a user device, such as a smart phone, tablet, PC, or other computing device. The map area can be based on the current user location, a user home location, or a location of interest specified by the user. Events in the area can be represented by different visual representations, depending on the popularity of the event. For example, a popular event in which a large percentage of the event capacity is attending can be represented differently than an event in which a small percentage of event capacity is attending. The data can be from different sources, such as people indicating they will attend through a pop-up window or other interface and/or people having purchased tickets for the event.

The user can select an event on the map, such as by tapping the event, clicking on the event, or hovering a cursor over the event. More details can be provided by the system for the event, such as by being displayed in a pop-up window. The details can include the event name, venue, date, time, number of people who have RSVP'd, number of people who have bought tickets, number of friends attending, age ranges of people attending, gender demographics of people attending, etc.

The user can filter the events for characteristics of importance. For example, the user may want to attend events having more females than males in attendance and/or having more young people than old people in attendance. The filter can be event and/or venue specific. For example, for a rock concert, the user may want a lot of people attending, while for a small acoustic event, the user may want fewer people attending. For a general admission venue, the user may also want fewer people attending. The pop-up window may also enable the user to purchase tickets to the event, share the event with others, invite others to attend the event, RSVP for the event, and the like. Thus, the user can customize filtering on a map-by-map basis or on an event-by-event basis.

According to an embodiment, a method can comprise providing, on a user device, a map of events within a geographical area. The map can comprise visual representations of the events. The method can further comprise providing different visual representations of the events based on a popularity of each event. The popularity can be determined by user-specified characteristics. The different representations can comprise different size objects and different color objects. The popularity can be based on a number of people attending, planning on attending, and/or indicating attendance of the event. The method popularity can be based on a number of friends of the user attending, planning on attending, and/or indicating attendance of the event.

Some of the events can be underway, e.g., have already commenced. In this instance, the event popularity map can show the actual number of people attending the event with reasonable accuracy. For example, the total number of tickets sold for the event can be considered, with a reasonable degree of accuracy, to be the number of people actually attending the event.

The map can have a feature that enables a pop-up window to be displayed when an event is selected, wherein the pop-up window comprises information about the number of people attending, planning on attending, and/or indicating attendance. The pop-up window can further display a gender breakdown of the number of people attending, planning on attending, and/or indicating attendance; an age breakdown of the number of people attending, planning on attending, and/or indicating attendance; and/or information (such as names) about friends of the user attending, planning on attending, and/or indicating attendance.

According to an embodiment, the event popularity map can comprise a geographical map having visual representations of events on the geographical map, wherein the visual representations are different based on a popularity of each event. The popularity can be determined by user-specified characteristics, such that an event popular for one user may be unpopular for another user. For example, one user may like general admission events with as few people as possible, while another user may like a "full house." The visual representations can comprise different size objects and different color objects. The popularity can be based on a number of people attending, planning on attending, and/or indicating attendance of the event. The popularity is based on a number of friends of the user attending, planning on attending, and/or indicating attendance of the event.

Figure 5:
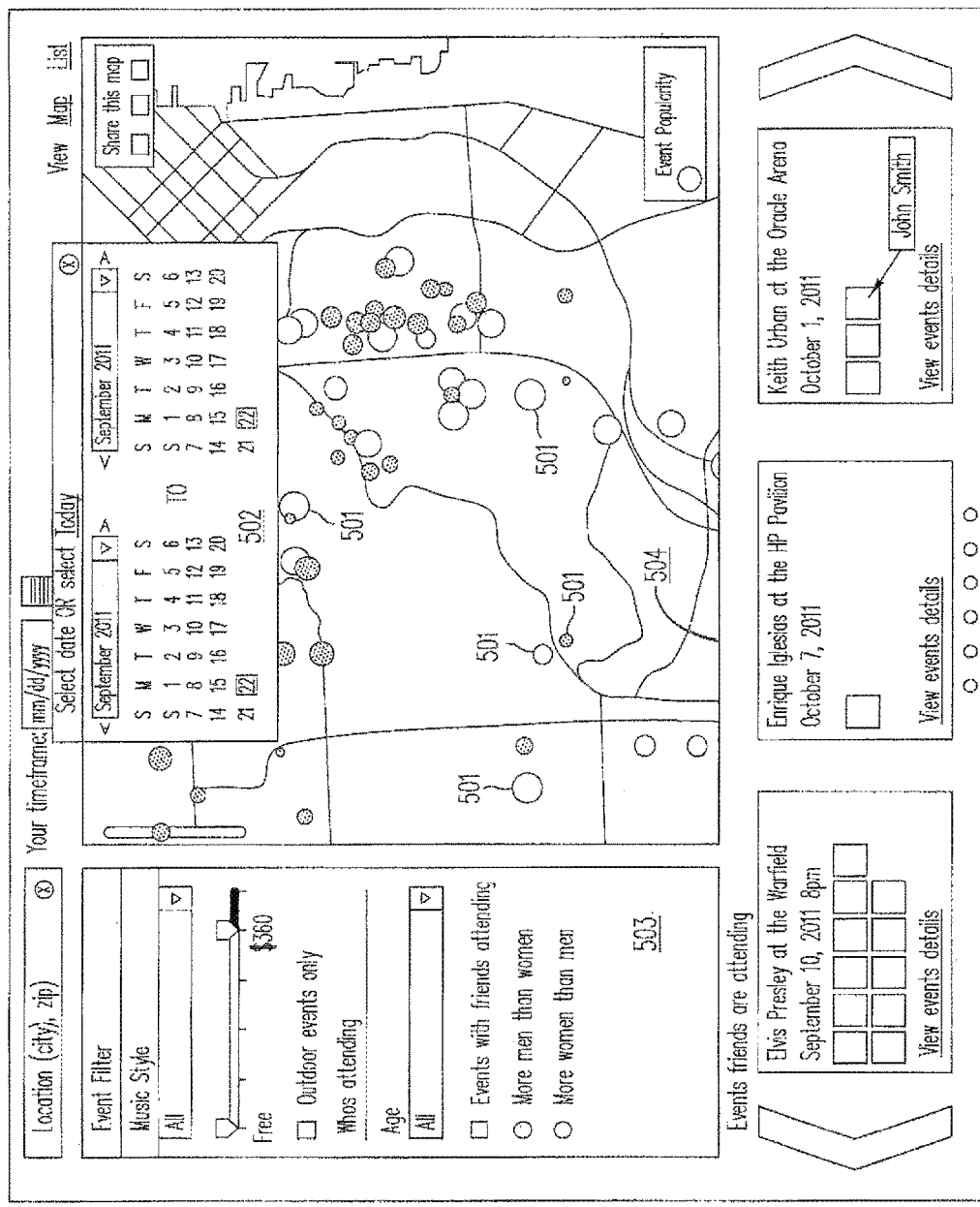
FIG. 5 is an example of a display (such as a screen shot) of a user-specific event popularity map containing event icons that can be shown on a user device, according to an embodiment.

FIG. 5 is an example of a display (screen shot) of an event popularity map containing event icons 501 that can be shown on the user's device 120 or the other user's devices 140, according to an embodiment. Only events that will occur during a specified period of time are shown. The period of time, e.g., the start date and the stop date, can be specified via calendars 502. Each of the event icons 501 can indicate when an event is to occur during the specified period of time.

Filters, such as event filters 503, can allow the user to filter the displayed evens, such as by music style, price, and type of venue (indoor vs. outdoor, for example), attendance of friends, distribution of genders, and the like. The events can be filtered according to any criteria for which information is available.

A scrollable window 504 can show pictures of the user's friends, for example, who intend to attend each of the displayed events. The scrollable window 504 can be scrolled horizontally, e.g., to the right and left, to show which of the user's friend intend to attend the events.

Figure 6:
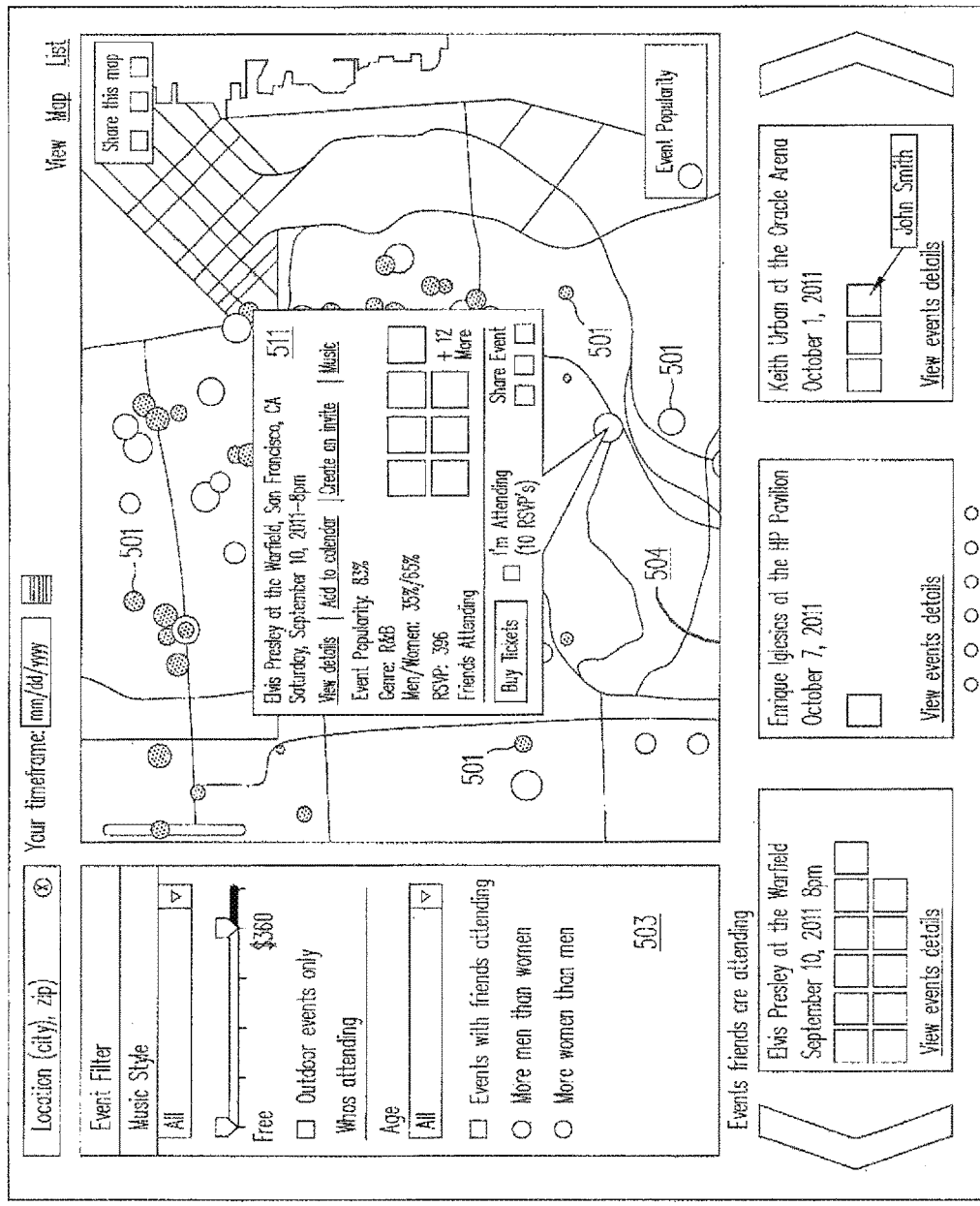
FIG. 6 is an example of a display (such as a screen shot) of a user-specific event popularity map containing event icons and a pop-up window that provides additional information, according to an embodiment.

FIG. 6 shows the event popularity map of FIG. 5 with a pop-up window 511 opened, according to an embodiment. The pop-up window 511 can provide information regarding a particular event, such as an event over which the cursor is hovering. For example, the pop-up window 511 can contain the name of the event, the venue for the event, the time and date for the event, as well as information regarding the event popularity (information regarding how many people plan to attend the event, how many of the user's friends plan to attend the event, etc.). The pop-up window 511 can contain pictures of the user's friends who intend to attend the event, a box to check if the user is planning to attend the event, and a feature for facilitating purchasing of tickets to the event by the user. The pop-up window 511 can contain one or more advertisements, such as for the event and/or merchandise associated with the event. The pop-up window 511 can contain any desired information.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
    a non-transitory memory storing upcoming event information for a plurality of upcoming events and map information for a geographic area associated with a venue; and
    one or more hardware processors in communication with the non-transitory memory and configured to:
        determine an upcoming event of the plurality of upcoming events at the venue for a user using the upcoming event information;
        determine a portion of capacity of the venue for the upcoming event using first ticket sales including unsold tickets and sold tickets to date for the upcoming event;
        determine an expected attendance for the upcoming event based on the first ticket sales;
        determine an event popularity map from the map information using the expected attendance for the venue and the portion of capacity; and
        communicate the event popularity map to a user device associated with the user for display on the user device.

2. The system of claim 1, wherein the one or more hardware processors are further configured to:
    determine at least one additional upcoming event for at least one additional venue within the geographic area using the upcoming event information and the map information; and
    provide the at least one additional upcoming event on the event popularity map.

3. The system of claim 2, wherein the one or more hardware processors are further configured to:
    determine percentages of capacity of the at least one additional venue for the at least one additional upcoming event using second ticket sales for the at least one additional upcoming event; and
    determine expected attendances for the at least one additional upcoming event based on the second ticket sales,
    wherein the event popularity map is further determined using the percentages of capacity and the expected attendances.

4. The system of claim 3, wherein the event popularity map indicates a popularity of the upcoming event and the at least one additional upcoming event using at least one of a color of an event icon for the upcoming event and the at least one additional upcoming event and a size of the event icon.

5. The system of claim 1, wherein the expected attendance is based upon a number of people who have purchased tickets for the upcoming event within a time frame.

6. The system of claim 1, wherein the expected attendance further comprises a number of friends of the user attending the upcoming event.

7. The system of claim 6, wherein the one or more hardware processors are further configured to:
    access social network information for the user and the friends of the user; and
    determine the number of the friends of the user attending the upcoming event using the social network information.

8. The system of claim 1, wherein the one or more hardware processors are further configured to:
    receive a communication including an indication of an event of interest to the user; and
    send, to the user device, a communication including additional information regarding the event of interest to the user.

9. The system of claim 8, wherein the event popularity map is determined in response to the upcoming event being the event of interest to the user.

10. A method comprising:
    determining an upcoming event at a venue for a user using upcoming event information for a plurality of upcoming events;
    determining a portion of capacity of the venue for the upcoming event using first ticket sales comprising unsold tickets and sold tickets to date for the upcoming event;
    determining an expected attendance for the upcoming event based on the first ticket sales;
    determining an event popularity map from map information for a geographic area associated with the venue, wherein the event popularity map is determined using the expected attendance for the venue and the portion of capacity; and
    communicating the event popularity map to a user device associated with the user for display on the user device.

11. The method of claim 10, further comprising:
   determining at least one additional upcoming event for at least one additional venue within the geographic area using the upcoming event information and the map information; and
   providing the at least one additional upcoming event on the event popularity map.

12. The method of claim 11, further comprising:
   determining percentages of capacity of the at least one additional venue for the at least one additional upcoming event using second ticket sales for the at least one additional upcoming event; and
   determining expected attendances for the at least one additional upcoming event based on the second ticket sales,
   wherein the event popularity map is further determined using the percentages of capacity and the expected attendances.

13. The method of claim 12, wherein the event popularity map indicates a popularity of the upcoming event and the at least one additional upcoming event using at least one of a color of an event icon for the upcoming event and the at least one additional upcoming event and a size of the event icon.

14. The method of claim 10, wherein the expected attendance is based upon a number of people who have purchased tickets for the upcoming event within a time frame.

15. The method of claim 10, wherein the expected attendance further comprises a number of friends of the user attending the upcoming event.

16. The method of claim 15, further comprising:
   accessing social network information for the user and the friends of the user; and
   determining the number of the friends of the user attending the upcoming event using the social network information.

17. The method of claim 10, further comprising:
   receiving a communication including an indication of an event of interest to the user; and
   sending, to the user device, a communication including additional information regarding the event of interest to the user.

18. The method of claim 17, wherein the event popularity map is determined in response to the upcoming event being the event of interest to the user.

19. One or more non-transitory machine-readable media having stored thereon machine-readable instructions that when executed by a system cause the system to perform operations comprising:
   determining an upcoming event at a venue for a user using upcoming event information for a plurality of upcoming events;
   determining a portion of capacity of the venue for the upcoming event using first ticket sales comprising unsold tickets and sold tickets to date for the upcoming event;
   determining an expected attendance for the upcoming event based on the first ticket sales;
   determining an event popularity map from map information for a geographic area associated with the venue, wherein the event popularity map is determined using the expected attendance for the venue and the portion of capacity; and
   communicating the event popularity map to a user device associated with the user for display on the user device.

20. The non-transitory machine-readable media of claim 19, wherein the expected attendance is based upon a number of people who have purchased tickets for the upcoming event within a time frame.

* * * * *